United States Patent [19]

Dowell

[11] Patent Number: 4,765,436
[45] Date of Patent: Aug. 23, 1988

[54] DRY FRICTION DAMPER WITH DAMPING FORCE PERPENDICULAR TO PRINCIPAL DIRECTION OF A VIBRATION

[75] Inventor: Earl H. Dowell, Durham, N.C.

[73] Assignee: Duke University, Durham, N.C.

[21] Appl. No.: 940,108

[22] Filed: Dec. 10, 1986

[51] Int. Cl.[4] .............................................. F16F 15/00
[52] U.S. Cl. ..................................... 181/207; 181/208
[58] Field of Search ................................ 181/207-209

[56] References Cited

U.S. PATENT DOCUMENTS

| | | |
|---|---|---|
| 1,443,545 | 1/1923 | Lord . |
| 2,717,747 | 9/1955 | Rosenweig . |
| 2,925,973 | 2/1960 | Aebersold . |
| 3,071,217 | 1/1963 | Gould . |
| 3,078,969 | 2/1963 | Campbell et al. ............... 181/208 X |
| 3,087,565 | 4/1963 | Kerwin, Jr. .......................... 181/208 |
| 3,087,569 | 4/1963 | Kurtze .................................. 181/208 |
| 3,419,260 | 12/1968 | Hrusovsky . |
| 4,288,063 | 9/1981 | Brenner et al. ...................... 267/8 R |
| 4,425,980 | 1/1984 | Miles .................................... 181/208 |
| 4,516,658 | 5/1985 | Scarton et al. ....................... 181/208 |

OTHER PUBLICATIONS

"Friction Damping of Resonant Stresses in Gas Turbine Engine Airfoils", J. H. Griffin, ASME Publication, Paper No. 79-GT-109, 1979.

"Structural Damping by Slip in Joints", L. Jezequel, Journal of Vibration, Acoustics, Stress and Reliability in Design, vol. 105, Oct. 1983.

"Forced Response of a Contilever Beam with a Dry Friction Damper Attached," (Part I: Theory and Part II: Experiment) by E. H. Dowell & H. B. Schwartz, pp. 255-267; 269-291 of Journal of Sound and Vibration, 1983, vol. 91.

Primary Examiner—Benjamin R. Fuller
Attorney, Agent, or Firm—Oblon, Fisher, Spivak, McClelland & Maier

[57] ABSTRACT

In a body subject to a cyclic energy of such a nature as to cause the body to mechanically vibrate with a principal motion in a first direction, a dry friction damper has a first sliding element fixed to the body, the first sliding element having a first rigid dry sliding surface extending in a second direction having a component perpendicular to the first direction. A second stationary element has a second rigid dry sliding surface extending in the second direction. A normal force is applied between the first and second surfaces, resulting in damping of vibrations by dry friction damping.

12 Claims, 4 Drawing Sheets

DRY FRICTION DAMPER WITH DAMPING FORCE PERPENDICULAR TO PRINCIPAL DIRECTION OF A VIBRATION

This invention was made with Government support under AFOSR-85-0137 awarded by the Air Force. The Government has certain rights in this invention.

BACKGROUND OF THE INVENTION

1. Field of the Invention

The present invention is directed to a dry friction damper for damping vibrations in a body subject to cyclic energy.

2. Discussion of the Related Art

Numerous techniques have been proposed for the damping of vibrations in a body. One known technique involves constraining an elastic damping layer between two rigid layers to form a laminate. Upon the laminate being subject to vibrations, the resulting deformation of the laminate gives rise to damping as energy is absorbed in the soft intermediate layer. An example of such constrained layer damping may be found in U.S. Pat. No. 3,071,217 to Gould.

Related to the above damping technique is the damping or vibration isolation technique of mounting a vibrating member on a vibration isolator, such as a rubber mount. This is often used in automobile suspensions and is illustrated in U.S. Pat. No. 2,717,747 to Rosenzweig.

Also known is hydraulic damping in which energy is absorbed by forcing an incompressible fluid through an orifice. This is illustrated in U.S. Pat. No. 4,288,063 to Brenner et al.

Several dry friction damping techniques are also known. One type involves the relative movement of an elastic element relative to a rigid element, with damping resulting from compression and shear of the elastic element, as well as by slipping friction of the elastic element relative to the rigid element. This is shown in U.S. Pat. No. 2,925,973 to Aebersold.

Yet another form of dry friction damping, known as Coulomb friction damping, arises due to the relative sliding of two smooth, flat rigid surfaces, rather than as a result of the distortion of an elastic element. It has been known, for example, to use Coulomb friction in the damping of cantilever beams, such as turbine blades. This is described in "Friction Damping of Resonant Stresses in Gas Turbine Engine Airfoils, *J. H. Griffin*, ASME Paper No. 79/GT-109, and is generally illustrated in FIG. 1. There, dry friction damping is achieved by the provision of a link 6 fixed to a vibrating point 8 on a gas turbine blade 4. The distal end 10 of the link 6 is held pressed against a surface 12 of a relatively rigid structure such as a cover plate of the engine. The normal pressing force of the distal end 10 of the link 6 against the surface 12 is provided by the inherent resilience or springiness of the link itself. Upon the blade 4 being subject to vibrations, relative slip occurs between the surface 12 and the distal end 10, whereby energy dissipation results. Such slippage occurs when the load on the link due to the vibration exceeds the friction force $\mu N$, wherein $\mu$ is the coefficient of friction between the link and the surface 12, and N is the normal force. It may be appreciated that the slip occurs in a direction 14 which is parallel to the principal vibrational direction of the blade.

However, such dry friction dampers which rely on Coulomb friction damping by point or small area contact between a vibrating member and a relatively stationary surface have been found to be ineffective at high vibration levels when slip occurs in a direction which is parallel to the principal vibrational direction.

U.S. Pat. No. 4,516,658 to Scarton et al discloses the uses of Coulomb damping by laying a flat plate of extensive area on a plate to be damped. Such a technique, however, is not effective for many damping applications, such as, for example, the damping of a vibrating beam such as a turbine blade.

The ASME Paper 81-DET-139, "Structural Damping by Slip Joints", *L. Jezequel*, concludes from theoretical analysis that a Coulomb friction mechanism leads to an equivalent linear viscous damping for large motions of a circular plate when slip occurs in a direction which is perpendicular to the principal vibrational direction.

SUMMARY OF THE INVENTION

It is an object of the invention to provide a dry friction damping means which is effective at high vibration levels.

According to the invention, in a body subject to cyclic energy of such a nature as to cause the body to mechanically vibrate with a principal motion in a first direction, there is provided a dry friction damping means having a first sliding element fixed to the body, the first rigid sliding element having a first dry sliding surface extending in a second direction having a component perpendicular to the first direction. A second stationary element having a second rigid surface extending in the second direction is in engagement with the first surface. Means are provided for applying a normal force between the first and second surfaces. That is, the sliding surfaces extend in a direction which is not parallel to the direction of principal body motion due to the vibration.

As an example, the body can be in the form of an elongate beam having one end fixed relative to the stationary element, for example, a turbine blade.

As another example, the body can be in the form of an elongate beam having one end fixed relative to a stationary member, and having the other end pinned, wherein the normal force is provided by gravity.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
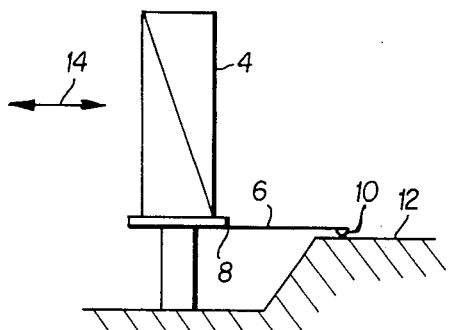
FIG. 1 is a schematic illustration of a turbine blade having conventional dry friction damping.

Preferred embodiments of the present invention will now be described with reference to the attached Figures, wherein the same reference numerals are used to refer to the same or similar parts throughout the several views.

Figure 2:
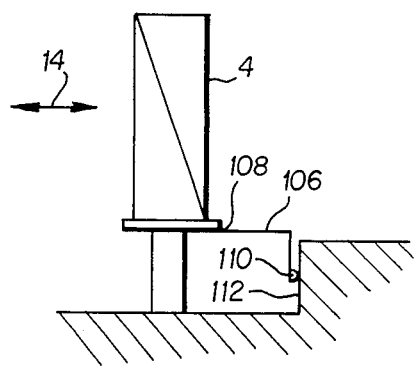
FIG. 2 is a schematic illustration of a turbine blade damped according to one embodiment of the invention.
Figure 3:
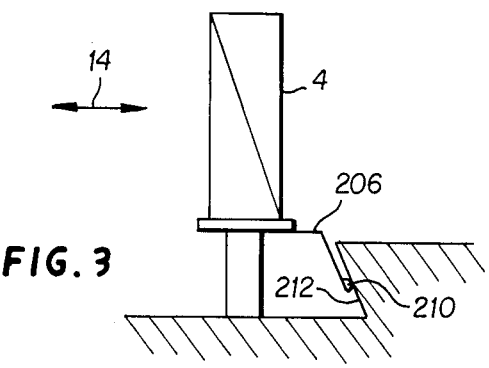
FIG. 3 is a schematic illustration of a turbine blade damped according to a second embodiment of the invention.

FIGS. 2 and 3 illustrate the use of the damping means of the invention for damping vibrations in a turbine blade, although it may be appreciated that the damping means of the invention is equally applicable to the damping of vibrations in other types of structures subject to cyclic energy of such a nature as to cause mechanical vibrations therein, for example, helicopter blades, fuselage panels in aircraft missiles or rotorcraft; also panels in other transportation vehicles such as automobiles or ships, or any similar plates or shells.

In FIG. 2, a link 106 is connected to a vibrating point 108 on a turbine blade 4. During operation of the turbine, the blade 4 vibrates with a principal motion in the direction 14. However, the distal end 110 of the link 106 (first rigid sliding surface) is pressed against the rigid surface 112 (second rigid sliding surface) of a stationary member by the resilient springiness of the link 106 which is formed of a metal or ceramic material. The surface 112 extends perpendicular to the vibrational direction 14.

FIG. 3 is similar to FIG. 2, except that the distal end 210 of the link 206 is pressed against surface 212 for sliding damping of vibrational motion. The surface 212 extends obliquely to the direction 14. That is, only a component of the direction of the surface 212 is transverse to the direction 14. In neither embodiment is the surface 112 or 212 parallel to the direction 14.

It has been found that providing vibration damping by dry friction sliding between surfaces extending in a direction having a component transverse to the principal vibrational motion direction of the body provides effective damping equivalent to linear viscous damping, even at high vibrational levels.

Figure 4:
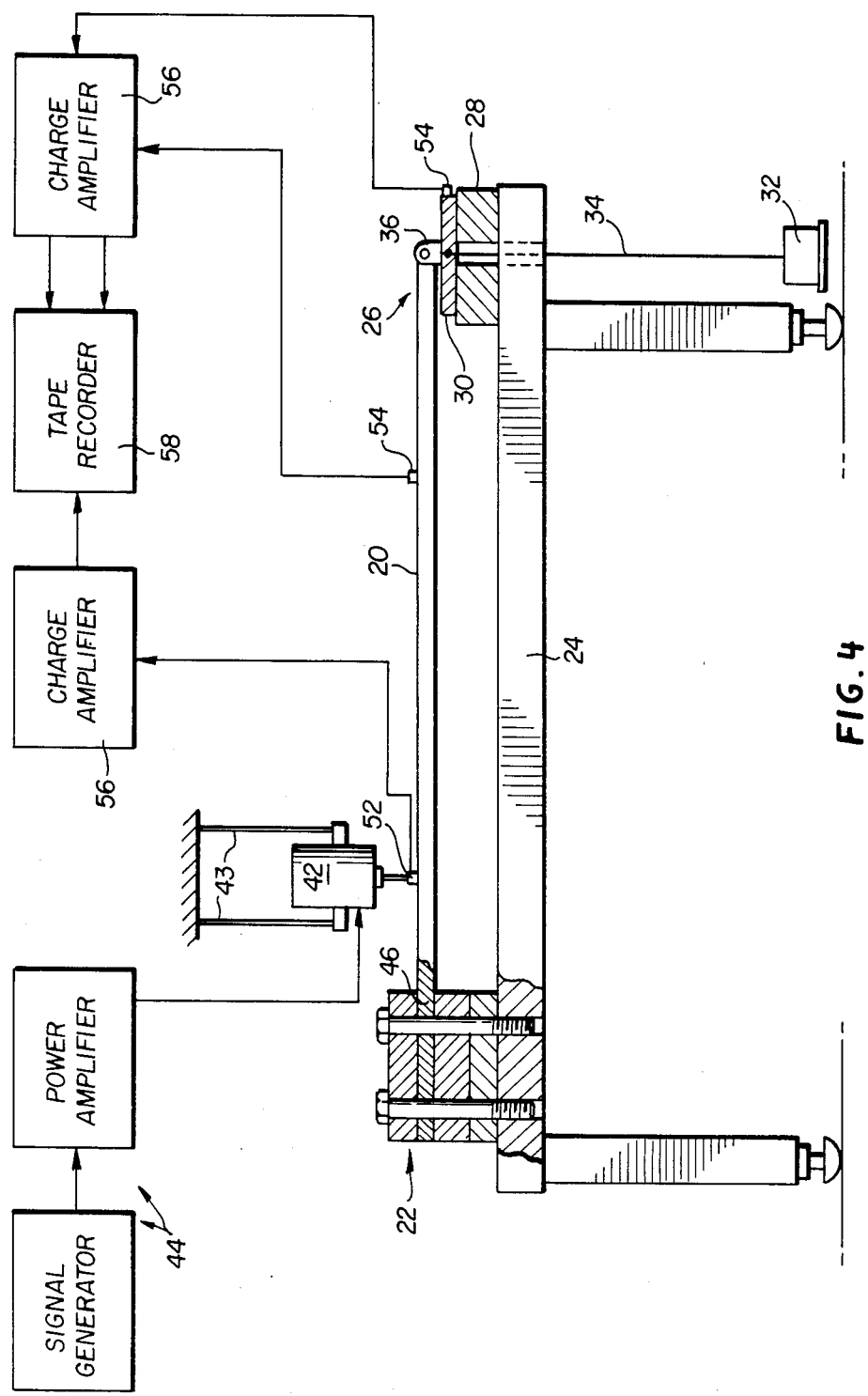
FIG. 4 is a schematic overall view of an experimental arrangement used for verifying damping according to the invention.

Experimental verification of the damping effect according to the present invention has been achieved by use of the set-up shown in FIG. 4. There, a steel beam 20 measuring 66.4 cm by 2.54 cm by 0.158 cm was clamped at one end by a clamped support 22 to a table 24 in the form of a rigid heavy steel I beam embedded in cement.

Figure 5:
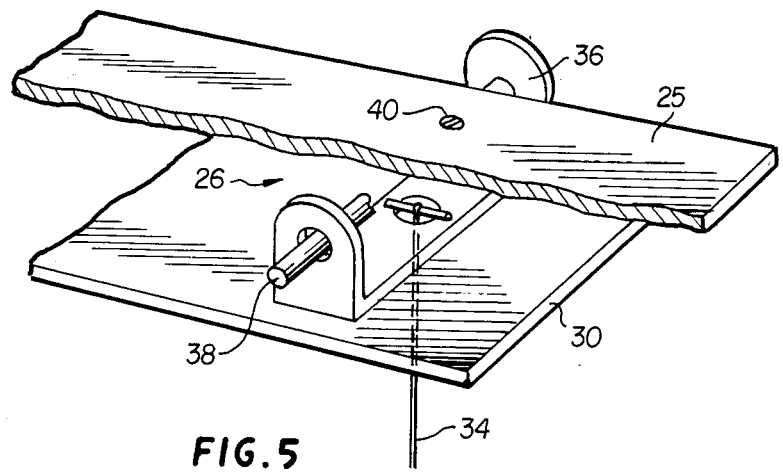
FIG. 5 is a detail, partially cut away, of the pinned connection of the beam of FIG. 4.
Figure 6:
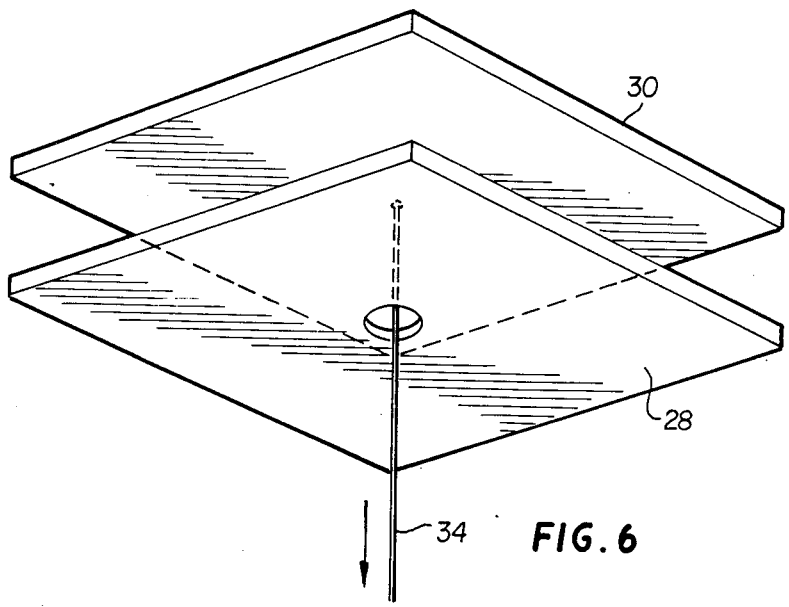
FIG. 6 is an exploded detail of the dry friction support in FIG. 4.

The other end 25 of the beam was pinned to a dry friction support 26 shown in FIGS. 5 and 6 so as to permit axial sliding of the end 25. A smooth steel lower damper plate 28 of the dry friction support was fixed to the table. The first rigid dry sliding surface of the smooth aluminum upper damper plate 30 of the dry friction support rested upon the lower damper plate 28. A normal force was applied between the upper and lower damper plates by the weight 32 hung from the cable 34 attached to the U-shaped second rigid dry sliding surface of the bearing member 36. A support pin 38 was rotatably mounted in holes of the bearing member 36 and the end 25 of the beam was fixed to the pin 38 by the screw 40, thereby permitting rotation of the end 25 of the beam about the support pin 38, but preventing translational movement of the end 25 of the beam except by sliding between plates 28 and 30.

Figure 7:
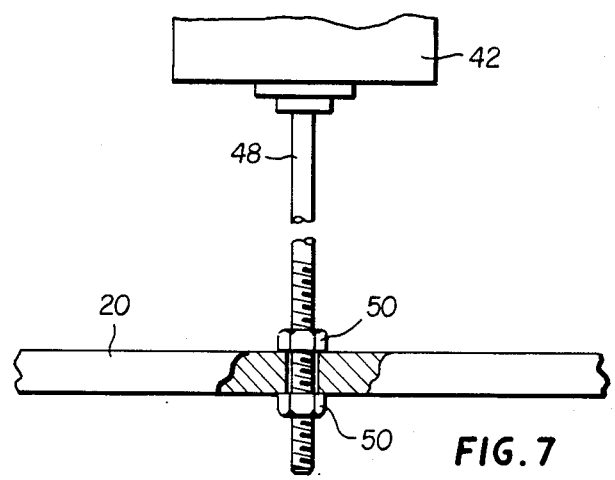
FIG. 7 is a detail of the shaker-beam connection of FIG. 4.

The beam was excited by a B & K electromagnetic shaker 42 mounted to a rigid support via bungees 43 and fed by a B & K random function generator 44. A 10 kHz bandwidth around the natural frequency of the beam was used. To minimize the mass and stiffness effect of the shaker 42, it was placed very close to the tightly clamped end 46 of the beam. This was achieved by drilling a hole in the beam and bolting the flexible push rod 48 of the shaker to the beam via nuts 50 (see FIG. 7).

A force transducer 52 (B & K 8200) was placed upon the shaker push rod 48 to measure the exciting force. A displacement transducer 54 (B & K R30), of small mass, was stuck upon the beam at several positions along its length in order to measure the response of the beam to the shaking. Charge amplifiers 56 (B & K 2635) integrated the response to return values of displacement.

Frequency, displacement and exciting force were then continuously recorded by a Hewett Packard reel-to-reel tape deck 58. This data was transferred onto a Zonic computer (not shown) which averaged a minimum of 20 readings for the three vibrational modes at each tested point on the beam. The damper was placed at 8 different locations (AD) on the beam.

Theoretically, the modal critical damping ratio ($\zeta_n$) should be derivable from equation 1 set forth below:

$$\zeta_n = \frac{\mu N}{\pi} \cdot \frac{1}{EI} \cdot \frac{1}{\frac{n\pi^2}{2}} \tag{1}$$

where n is vibrational mode number,
$\mu$ is coefficient of friction between the sliding plates
N is the normal force holding the sliding plates 28 and 30 together,
a is length of beam,
E is modulus of elasticity of beam,
I is moment of inertia of beam.

Figure 8:
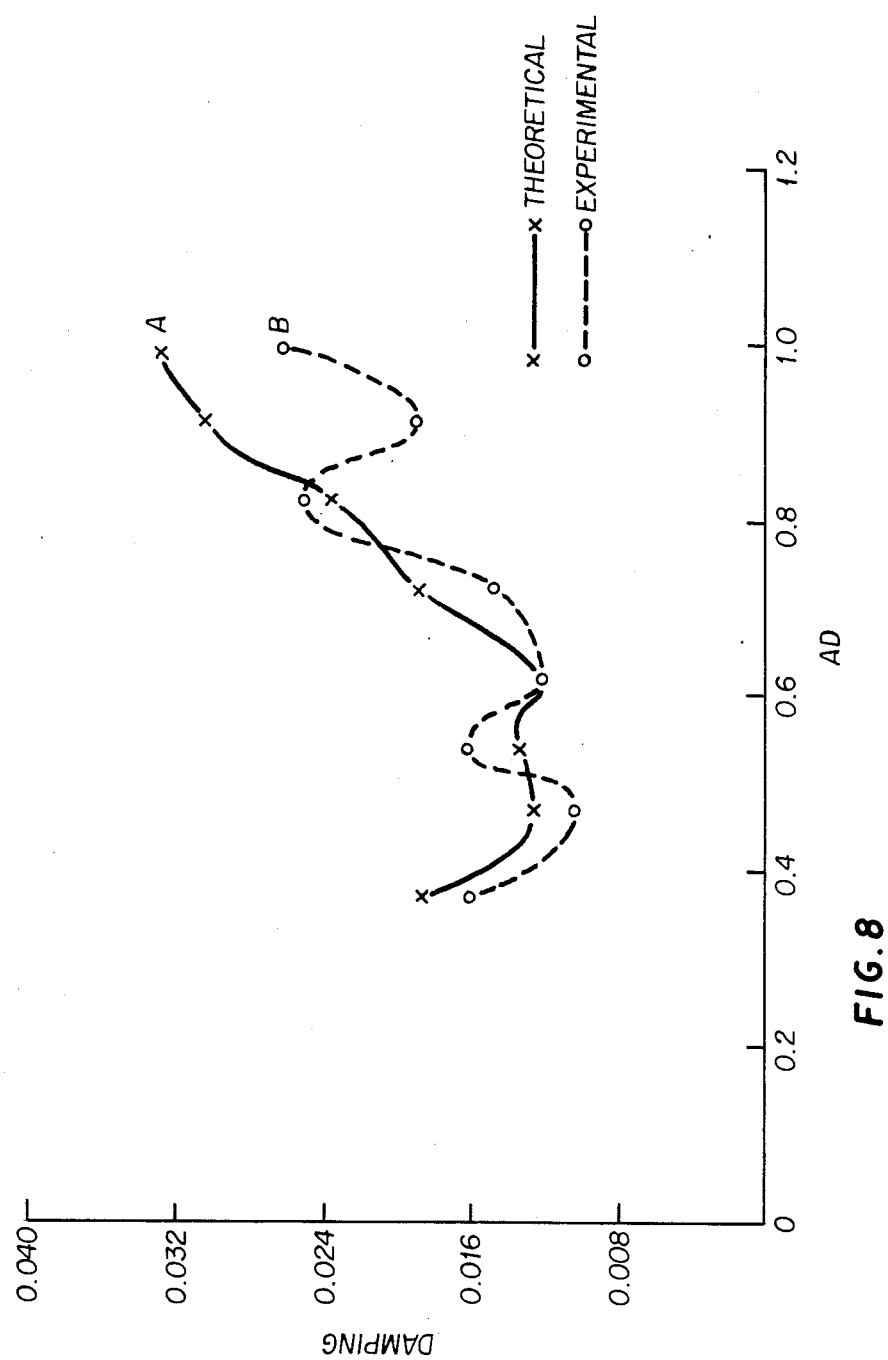
FIG. 8 is a graph showing first mode frequency damping for a dry friction damper placed at various points along the length of the beam of FIG. 4.

FIG. 8 compares theoretical damping and that found in the above experiment for various AD positions (AD being the ratio of the distance of the dry friction damping element from the clamping point to the beam length) for the first vibrational mode (n=1). A five kilogram normal force was used. In FIG. 8 theoretical damping is shown as line A with actually measured total damping shown as line B. It can be seen that there is fairly close agreement between the theoretical and experimentally achieved damping according to the invention. Total error between theory and experiment was found to be about 16%. Close agreement was also found between theoretical and experimentally determined damping in the second vibrational mode. In the third vibrational mode, experimentally determined damping was actually found to be substantially higher than that predicted.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. In a body subject to cyclic energy of such a nature as to cause said body to mechanically vibrate with a principal motion in a first direction, a dry friction vibration damping means comprising:

a first sliding element fixed to said body and having a first rigid dry sliding surface extending in a second direction having a component perpendicular to said first direction;

a second stationary, element having a second rigid surface engaging said first surface and extending in said second direction; and means for applying a normal force between said first and second surfaces, whereby said vibrations are damped by dry friction damping.

2. The body of claim 1, wherein said body is elongate and has a first end fixed relative to said stationary element and a second end.

3. The body of claim 1, wherein said second direction is substantially perpendicular to said first direction.

4. The body of claim 2, wherein said second direction is substantially perpendicular to said first direction.

5. The body of claim 2, wherein said body is a turbine blade and said second end of said body is unconstrained.

6. The body of claim 5, wherein said first sliding element comprises a spring, and wherein said means for applying a normal force comprises a spring force of said spring.

7. The body of claim 6, wherein said second direction is perpendicular to said first direction.

8. The body of claim 2, wherein said second direction has a horizontal component, and wherein said means for applying a normal force comprises the weight of at least said body and first sliding element.

9. The body of claim 8, wherein said second end is supported for constraint against translational movement except between said first and second surfaces, and for rotation about an axis transverse to said first direction and to the length of said body.

10. The body of claim 9, wherein said second direction is perpendicular to said first direction.

11. The body of claim 10, wherein said second direction is horizontal.

12. The body of claim 11, wherein said means for applying a normal force further comprises an additional weight.

* * * * *